United States Patent [19]

Brendley, Jr. et al.

[11] Patent Number: 5,344,630
[45] Date of Patent: Sep. 6, 1994

[54] DEEP OXIDATION OF HALOGENATED ORGANICS WITH POROUS CARBONACEOUS MATERIALS

[75] Inventors: William H. Brendley, Jr., Hatboro, Pa.; Gerald Grunewald, Orange, Tex.; Steven Petrosius; Russell Drago, both of Gainesville, Fla.

[73] Assignee: Rohm and Haas Company, Philadelphia, Pa.

[21] Appl. No.: 721,763

[22] Filed: Jun. 28, 1991

[51] Int. Cl.$^5$ .............................. B01J 8/02; C01B 7/01
[52] U.S. Cl. .............................. 423/240 R; 423/245.3; 588/206; 588/207
[58] Field of Search .................. 423/210, 245.1, 245.3, 423/240 R, DIG. 20; 588/206, 207

[56] References Cited

U.S. PATENT DOCUMENTS

| | | | |
|---|---|---|---|
| 3,376,113 | 4/1968 | Frevel | 23/219 |
| 3,437,703 | 4/1969 | Reitmeier et al. | 260/669 |
| 3,453,073 | 7/1969 | Sims | 23/154 |
| 3,647,910 | 3/1972 | Jones et al. | 260/683.3 |
| 3,832,306 | 8/1974 | Hackett et al. | 252/442 |
| 3,859,375 | 1/1975 | Manning | 260/680 E |
| 3,892,679 | 7/1975 | Holler | 252/476 |
| 3,989,806 | 11/1976 | Hyatt | 423/502 |
| 3,989,807 | 11/1976 | Johnston | 423/502 |
| 4,040,990 | 8/1977 | Neely | 260/2.1 R |
| 4,053,557 | 10/1977 | Kageyama | 423/240 |
| 4,059,677 | 11/1977 | Sare et al. | 423/240 |
| 4,065,543 | 12/1977 | Sare et al. | 423/240 |
| 4,082,694 | 4/1978 | Wennerberg et al. | 252/444 |
| 4,301,126 | 11/1981 | Duembgen et al. | 423/240 |
| 4,400,309 | 8/1983 | Evans | 423/DIG. 20 |
| 4,423,024 | 12/1983 | Wolford | 423/437 |
| 4,478,954 | 10/1984 | Connolly et al. | 513/700 |
| 4,499,201 | 2/1985 | Leyerle | 502/180 |
| 4,587,116 | 5/1986 | Livingston et al. | 423/415 A |
| 4,652,690 | 3/1987 | Lee | 585/443 |
| 4,677,237 | 6/1987 | Imai et al. | 585/444 |
| 4,720,474 | 1/1988 | Vasilevskis et al. | 502/165 |
| 4,816,609 | 3/1989 | Harley | 570/226 |
| 4,827,066 | 5/1989 | Herber et al. | 585/319 |
| 4,839,331 | 6/1989 | Maroldo et al. | 502/416 |

(List continued on next page.)

FOREIGN PATENT DOCUMENTS 0317335  5/1989  European Pat. Off. .
4003668  8/1980  Fed. Rep. of Germany ... 423/245.3

OTHER PUBLICATIONS

Organic Polymers, Correlation between Their Structure and Catalytic Activity in Heterogeneous Systems. II. Models for Dehydrogenation Catalysts, J. Manassen and Sh. Khalif, *Journal of the American Chemical Society*, 88:9, May 5, 1966.

The Nature and Catalytic Influence of Coke Formed on Alumina Oxidative Dehydrogenation of Ethylbenzene, R. Fiedorow, W. Przystajko, M. Sopa and I. G. Dalla Lana, *Journal of Catalysis*, 68, 33–41 (1981).

Catalytic Oxidation of $CH_3Cl$ by $Cr_2O_3$, J. Weldon and S. M. Senkan, *Combus. Sci. and Tech.* 1986, vol. 47, pp. 229–237.

Pyrolysed Polyacrylonitrile (PPAN)-A Novel and Highly Selective Catalyst for the Oxidative Dehydrogenation of Butene to Butadiene, B. Ademodi, Stanley R. A. Macaulay and M. V. Cattaneo, *Journ. Chem. Tech. Biotechnol.* 1987, 40, 11–18.

Complete Catalytic Oxidation of Volatile Organics, James J. Spivey, *Ind. eng. Chem. Res.* 1987, vol. 26, 2165–2180.

Oxydehydrogenation of Ethylbenzene to Styrene over Metal Pyrophosphates 1. Catalyst Composition and Reaction Variables, G. Edwin Vrieland, *Journal of Catalysis 111*, 1–13 (1988).

(List continued on next page.)

*Primary Examiner*—Michael Lewis
*Assistant Examiner*—Stephen G. Kalinchak
*Attorney, Agent, or Firm*—Banner, Birch, McKie and Beckett

[57] ABSTRACT

A method for oxidizing halogenated organic compounds comprising passing a mixture of the halogenated organic compound and excess oxygen over a catalyst comprising a carbonaceous material under mild reaction conditions. The temperature of the reaction is below 400° C. and the catalyst may be doped with acidic redox-active metal compounds.

35 Claims, No Drawings

U.S. PATENT DOCUMENTS

| | | | |
|---|---|---|---|
| 4,943,671 | 7/1990 | Dockner et al. | 585/642 |
| 4,948,910 | 8/1990 | Young, Jr. et al. | 558/383 |
| 4,950,309 | 8/1990 | Schulz | 423/DIG. 20 |
| 5,021,383 | 6/1991 | Berty | 502/174 |

OTHER PUBLICATIONS

Variations in Activity and Selectivity for Supported KCl/CuO and KCl/CuCl$_x$ Catalysts, Atulya Saraf, Howard L. Greene, Michael S. Kosusko, Sundar Narayanan, Journal of Catalysis, 120, 478–483 (1989).

Decomposition of 1,2-Dichloroethane on TiO$_2$/SiO$_2$, Seichiro Imamura, Hiroyuki Tarumoto, Shingo Ishida, Ind. Eng. Chem. Res., 1989, vol. 28, 1449–1452, No. 10, 1989.

Decomposition of Chlorofluorocarbons by the Reaction with Water Vapor Catalyzed by Iron Oxide Supported on Activated Carbon, Susumu Okazaki, Akito Kurosaki, *Chemistry Letters*, pp. 1901–1904 1989.

Oxidative Dehydrogenation of Ethylbenzene To Styrene Over Carbon–Based Catalysts, G. C. Grunewald, R. S. Drago, *Journal of Molecular Catalysis*, 58 (1990) 227–233.

Preparation, Characterization, and Reactivity of a Novel Heterogeneous Catalyst for the Reduction of CO and CO$_2$, Gerald C. Grunewald, Russell S. Drago, Jeffrey L. Clark, Ann B. Livesey, Journal of Molecular Catalysis, 60 (1990) 239–253.

Ambersorb Carbonaceous Adsorbents, *Technical Notes*, Rohm and Haas, Philadelphia, Pa. 19105.

Nature of Active Coke in the Oxydehydrogenation of Ethylbenzene to Styrene, Luis E. Cadus, Osvaldo F. Gorriz, Juan B. Rivarola, Ind. Eng. Chem. Res., vol. 29, No. 7, 1990.

Oxidative Catalysis of Chlorinated Hydrocarbons by Metal-Loaded Acid Catalysts, Sougato Chatterjee, Howard L. Greene, *Journal of Catalysis*, 130, 76–85 (1991).

DEEP OXIDATION OF HALOGENATED ORGANICS WITH POROUS CARBONACEOUS MATERIALS

BACKGROUND OF THE INVENTION

The present invention relates to the oxidation of halogenated organic compounds. In particular, the invention relates to a method for oxidizing halogenated organic compounds in the presence of a carbonaceous catalyst.

Halogenated organic compounds are useful for a number of purposes. In most applications of these materials, particularly in their use as solvents, the spent materials are discarded. Furthermore, the production and use of these halogenated organic compounds often result in the production of unwanted halogenated organic compound by-products. Unwanted by-products also are produced in processes employing halogenated organic compounds as intermediates. These unwanted by-products represent a waste of both the halogen and organic compounds thereof. It has been suggested that spent and unwanted halogenated organic compounds be further processed to provide useful materials, but often the capital investment required for such an operation far exceeds the economic justification for the further processing. Therefore, these unwanted halogenated organic compound by-products must be discarded.

Disposal of halogenated organic compounds is complicated by the fact that these compounds cannot merely be released to the atmosphere or flushed away with water without causing serious pollution problems. The pollution problems arise because of the carcinogenic properties, the toxicity of some of the halogenated organic compounds, their immiscibility with water, and in many cases, their chemical stability which prevents them from breaking down readily into harmless waste products.

Typical disposal methods for the undesirable halogenated organic compound by-products consist primarily of terrestrial burial methods. These disposal methods include ocean discharge, open pit burning, drum burial, and deep-well disposal. However, these methods have engendered serious criticism as being hazardous to the environment and are known to have contaminated ground water. In addition, these methods are economically unattractive because the cost of the disposal of the unwanted halogenated organic compound by-product is not diminished by recovery of some material of significant economic worth.

Incineration of the undesirable halogenated organic compound also has been proposed. U.S. Pat. No. 3,453,073 discloses a process for recovering halogen from halogenated hydrocarbons comprising passing a chlorinated hydrocarbon, water and oxygen over catalysts at elevated temperatures to form oxides of carbon, water, and hydrogen chloride. This process, however, requires the utilization of elevated temperatures which requires special equipment that is stable at such high temperatures and will resist corrosion by the hydrogen chloride and water produced. The production of carcinogenic materials such as dioxin also is a serious impediment to this mode of disposal.

U.S. Pat. Nos. 1,989,806 and 3,989,807 propose a process for the recovery of chlorine from chlorinated organic compounds which comprises catalytically oxidizing a chlorinated organic compound feed by reacting the chlorinated organic feed with oxygen or an oxygen-containing gas at a reaction temperature of below 500° C. and in the presence of a transition metal-containing supported catalyst. The catalytic supports employed in this method include zeolite materials and activated alumina. U.S. Pat. Nos. 4,059,677 and 4,065,543 also disclose a method for recovering halogen from halogenated organic compounds which comprises reacting the halogenated hydrocarbon with oxygen at relatively mild temperatures in the presence of a metal oxide catalyst system. The metal oxide catalyst system utilized in this method includes manganese oxide and cobalt oxide. U.S. Pat. No. 4,423,024 also proposes a method for oxidizing a halogenated organic compound comprising re-heating a mixture of the halogenated hydrocarbon, oxygen, and, where necessary, water and contacting this mixture with a molecular sieve catalyst at relatively mild temperatures.

There also are known methods for regenerating saturated catalysts used to remove harmful organic compounds from water, soil or air. Typical regeneration methods include steam regeneration, superloading the catalyst and solvent regeneration. These methods have the drawback that although the catalyst may be regenerated, the steam or solvent effluent stream remains contaminated by the harmful organic compound and must be treated before disposal.

SUMMARY OF THE INVENTION

The present invention is useful in the disposal of harmful halogenated organic compounds and in the regeneration of saturated carbonaceous adsorbents that have been used to remove halogenated organic compounds from soils, water and other solutions, and air.

The present invention provides a process for oxidizing halogenated organic compounds comprising passing a mixture of the halogenated organic compound and excess oxygen over a catalyst at relatively mild temperatures wherein the catalyst comprises a carbonaceous material having a pore size, pore volume and surface area effective to completely oxidize the halogenated hydrocarbon. The temperature of the catalytic reaction is at most about 400° C., and the catalyst may be doped with an acidic redox-active transition metal compound.

DETAILED DESCRIPTION

The present invention is based on the discovery that carbonaceous adsorbents are useful in the complete catalytic oxidation of halogenated organic compounds. Complete oxidation of the halogenated organic compound can be realized at relatively mild temperatures in the presence of such catalyst. Also, carbonaceous adsorbents which have been used to remove halogenated organic compounds from soil, water and other solutions, or air can be regenerated by oxidation at relatively mild reaction temperatures. The catalytic oxidation of halogenated organic compounds is effected either by passing a mixture of oxygen and the organic compound over the catalyst or by passing a stream of oxygen through a carbonaceous adsorbent saturated with the halogenated organic material. If required, water can be added as one of the reactants as a source of hydrogen, (if the particular halogenated organic compound is deficient in hydrogen), to complete the conversion to carbon dioxide and acid.

Throughout the specification and claims, the phrase "halogenated organic compound", when used to describe a reactant to be oxidized in accordance with the method of the invention, means any compound susceptible of oxidation which consists essentially of carbon, hydrogen and halide. Any halogenated organic compound can be oxidized according to the present invention including aliphatic halides as well as aromatic halides. Other halogenated organic compounds which can be oxidized include those compounds containing a component functional moiety where one of the hydrogens of the organic compound is substituted by an atom or functional moiety other than the halide. These functional moiety include any functional group to which a halogenated organic compound can be attached.

More specifically, the halogenated organic compound can be selected from the group consisting of $CH_2Cl_2$, $CH_2BR_2$, $CH_2BrCl$, $CHCl_3$, $CHBrCl_2$, $CHBr_2Cl$, $C_2H_3Cl_3$ (all isomers), $C_2Cl_4$, 1,2-dichloroethylene, 1,1-dichloroethylene, 1,2-dichloroethane, 1,1-dichloroethane, 1,1,2-trichloroethane, methylchloroform, 1,1,2,2-tetrachloroethane (and other isomers), trichloroethylene, $CCl_4$, $CHBr_3$, chlorinated benzenes such as PCB, chlorinated pesticides such as dieldrin ($C_{12}H_8Cl_6O$), endrin ($C_{12}H_8Cl_6O$), aldrin ($C_{12}H_8Cl_6$), and DDT ($C_{14}H_9Cl_5$), $CH_2ClOC_2H_5$, $ClCH_2SC_2H_5$, $(ClC_2H_4)_2S$ chlorophenols, and dioxin. Halogenated organic compounds such as $CH_2Cl_2$, $C_2H_2Cl_4$, $C_2H_4Cl_2$, $CH_2BR_2$, and trichlorobenzene ave particularly preferred.

Specific aliphatic halogenated hydrocarbons of the present invention correspond to the formula $C_nH_mX_p$; wherein n is a whole number, preferably from 1 to 10 inclusive, move preferably no move than 5, and most preferably no more than 3; p is a whole number from 1 to $(2n+2)$ inclusive; m is represented by $(2n-p+2)$, is a whole number from 0 to $(2n-p+2)$ inclusive; and X represents any halide, preferably chlorine and bromine, and most preferably chlorine. The stoichiometric quantities of oxygen, carbon dioxide and acid can then be calculated from the following formula for the reaction;

$$C_nH_mX_p + (p-n-1)H_2O + \tfrac{1}{2}(3n-p+1)O_2 = nCO_2 + pHX$$

When the molar ratio of halide to hydrogen is less than 1, (i.e. p is less than m), it can be seen that water will be produced by the above equation due to the negative sign before the $H_2O$. Alternatively, when the molar ratio of halide to hydrogen is greater than 1, (i.e. p is greater than m and the organic compound is deficient in hydrogen), additional hydrogen must be supplied through the addition of water as would be shown by a positive integer before $H_2O$ in the above equation.

The following examples will illustrate the above relationship in more detail. If the halogenated organic compound $C_2H_4Cl_2$ were oxidized, p would be less than m and water would be produced. In the above compound, $n=2$, $p=2$, and $m=(2n-p+2)=4$. The stoichiometric amount of $H_2O$ would then be p-n-1 or -1. This would indicate that one mole of $H_2O$ would be produced. On the other hand if the halogenated organic compound $CHCl_3$ were oxidized, p would be greater than m and water would be a reactant. In the compound $CHCl_3$, $n=1$, $p=3$, and $m=(2n-p+2)=1$. The stoichiometric amount of $H_2O$ would then be p-n-1 or +1. Thus, water would be a reactant.

The amount of water required to complete the conversion of a hydrogen-deficient halogenated organic compound must be at least stoichiometrically sufficient to oxidize all of the available carbon content to carbon dioxide and to convert all of the halogen and hydrogen content of the halogenated organic compound to acid. Generally, the amount of water actually utilized will be far in excess of the stoichiometric amount required to ensure complete oxidation of the hydrogen deficient halogenated organic compound. In accordance with the guidelines provided herein, the skilled practitioner in the art will be able to vary the amounts and sources of the water.

The halogenated organic compound of the present invention is completely oxidized to carbon dioxide, water, and HX. The expression "complete oxidation" means at least 70% of the halogenated organic compound has been oxidized. Preferably, 80%; more preferably 90%; and most preferably all of the halogenated organic compound has been converted. To ensure complete oxidation, excess oxygen is required. The amount of oxygen used in the oxidation of the halogenated hydrocarbons in accordance with the present process should be in an amount that is sufficient to incinerate (oxidize) the specific quantity of halogenated hydrocarbon contained in the supply stream. The amount of oxygen should be at least stoichiometrically sufficient to oxidize substantially all of the carbon content of the halogenated hydrocarbon to carbon dioxide and when the molar ratio of halogen to hydrogen in the hydrocarbon is less than 1 preferably is sufficient to oxidize both the carbon content and available hydrogen content of the halogenated hydrocarbon to carbon dioxide and water, respectively. The available hydrogen content is the hydrogen remaining after the hydrogen and halide have reacted to form the acid.

Generally, the amount of oxygen used will be far in excess of the stoichiometric amounts required to ensure substantially complete oxidative decomposition of the halogenated hydrocarbon compound. The amount of excess oxygen used can vary provided that sufficient quantities are made available to accomplish the aforesaid described degree of oxidation. The oxygen can be provided by utilizing air, oxygen, or oxygen-enriched air, The oxygen-containing stream also can be mixed with steam. One advantage of using steam is to recover the acid in an aqueous solution.

In one embodiment of the process of the present invention, the oxygen is bubbled through the halogenated organic compound liquid mixture and the resultant saturated gas stream, which is saturated with respect to the halogenated organic compounds, then is passed over the catalyst. Lower feed rates of the halogenated organic compounds can be attained by passing the oxygen over a reservoir of liquid (heated or cooled if necessary) comprising the halogenated organic compound, to obtain a gaseous feed stream which is unsaturated with respect to the halogenated organic compounds. In another embodiment, the halogenated organic compound is delivered as a liquid and volatilized in a precatalyst reactor zone. The vapor is carried to the catalyst rather than bubbling the oxygen through the liquid. This method allows for feed rates greater than those achieved by bubbling oxygen containing gas through the reactant because the concentration of the reactant in the vapor is not limited by equilibrium (saturation) considerations. In another embodiment, the catalyst is saturated with a halogenated organic compound (for example, by using the catalyst to remove halogenated organic compounds from soil, water and other solutions, or air), and then heated to the reaction temperature while passing oxygen, air, or mixtures of steam with oxygen or air, over it to oxidize the halogenated organic compound and regenerate the catalyst.

The carbonaceous catalyst to be employed in the process of this invention comprises any form of carbon which catalyzes oxidation of a halogenated organic compound to carbon dioxide and an acid. Any form of carbon which catalyzes the oxidation of halogenated organic compounds to carbon dioxide, water and an acid is acceptable. Thus, carbon derived from any animal, plant or mineral source can be used. Examples of suitable carbon catalysts include, but are not limited to, the following: activated carbons such as those derived from coal, wood, coconut shells, lignin or animal bones: carbon blacks such as those derived from gas phase pyrolysis of hydrocarbons; natural or synthetic graphites or graphite whiskers; supported pyrolytic carbons wherein the support is an inorganic refractory oxide, inorganic phosphate, inorganic boride, or inorganic nitride; cokes such as those obtained from the destructive distillation of bituminous coal, petroleum, and coaltar pitch; and chars and polymeric carbons prepared by pyrolysis of resinous polymers. Additionally, it is acceptable to employ high surface area carbons prepared by direct chemical activation. Such chemically activated, high surface area carbons are described by T. M. O'Grady and A. N. Wennerberg in *Petroleum Derived Carbons,* American Chemical Society Symposium Series, Vol. 303, J. D. Bacha et al., eds., American Chemical Society Publications, Washington, D.C., 1986. The preparation of these high surface area carbons involves reacting petroleum coke or other carbonaceous sources with excess potassium hydroxide at about 450° C. to obtain an intermediate product which is subsequently pyrolyzed at about 850° C. to the high surface area carbon.

Some of the above-identified carbons, for example the activated carbons and graphites, are "soft" carbons which are known to break apart easily and slough dust particles. Others of the above-identified carbons are non-graphitizable or "hard" carbons, which are known to possess good structural integrity and do not slough dust particles. The carbons prepared by the pyrolysis of resinous polymers are an example of hard carbons. Preferably, the catalyst employed in the process of this invention is a hard carbon. More preferably, the catalyst employed in the process of this invention is a hard carbon prepared by the pyrolysis of a resinous polymer.

The hard carbon catalysts which are prepared by the pyrolysis of resinous polymers are known in the art. The catalysts and their method of preparation are described in U.S. Pat. No. 4,040,990, which is incorporated herein by reference. As described therein, these carbons are partially pyrolyzed particles preferably in the form of hard beads or spheres. They are produced by the controlled decomposition of a synthetic polymer. The pyrolysis, as described in U.S. Pat. No. 4,040,990, is generally conducted in an inert atmosphere comprised of, for example, helium, argon, or nitrogen. Preferably, the polymer is heated rapidly to a maximum temperature in the range from about 300° C. to about 900° C.; heated at the maximum temperature for a period of up to about 20 minutes; and cooled to room temperature before exposing to air. For the purposes of this invention, maximum temperatures of up to about 1200° C. are also suitable, and longer heating times are not deleterious.

Any of the many synthetic polymers, disclosed in U.S. Pat No. 4,040,990 and incorporated herein by reference, can be employed in preparing the hard carbon catalyst for the process of this invention. Preferred are polymers derived from aliphatic and aromatic materials which are ethylenically unsaturated. Preferably, the polymer is cross-linked, because cross-linking stabilizes the polymer thermally and leads to greater carbon yields. Preferably also, the polymer contains a carbon-fixing moiety, such as a cation, anion, strong base, weak base, sulfonic acid, carboxylic acid, halogen, or alkylamine moiety. The more preferred polymers include polylvinylidene chloride, and macroreticular ion-exchange resins-derived from aliphatic and aromatic materials which are ethylenically unsaturated. Most preferably, the polymer is a polystyrene divinylbenzene sulfonic acid ion-exchange resin. In addition to the polymers disclosed in U.S. Pat. No. 4,040,990, any of the polysulfonated polymers disclosed in U.S. Pat. No. 4,839,331, and incorporated herein by reference, can be employed in preparing the hard carbon catalyst for the process of the invention.

The preferred hard carbon catalyst, which is prepared by the pyrolysis of a resinous polymer, contains at least three distinct sets of pores of differing average size. One set comprises large pores, macropores, which originate from the resinous starting material, and typically range in size of at least 500 Angstroms in average diameter. The second set comprises intermediate pores, mesopores, which typically range in size from about 20 Angstroms to about 500 Angstroms. The third set and smallest pores, micropores, originate on pyrolysis of the resinous polymer. These small pores are typically less than about 20 Angstroms in average diameter; however, the exact size depends on the temperature of pyrolysis. In addition to pore size, the pyrolysis temperature also controls total pore volumes. Generally, as the pyrolysis temperature increases, the micropore volume increases. However, at pyrolysis temperatures about 900° C., the micropore volume is low. It is believed that the micropores control the product selectivities in the deep oxidation reaction; however, such a theory should not be construed to be binding or limiting of the scope of the invention.

The macropore volume of the carbon catalyst of this invention should be at least 0.10 ml/g; preferably in the range from about 0.10 ml/g to about 0.35 ml/g; more preferably in the range from about 0.15 ml/g to about 0.30 ml/g; and most preferably in the range from about 0.20 ml/g to about 0.25 ml/g. The mesopore volume of the carbon catalyst of the present invention is typically in the range from about 0.05 ml/g to about 0.30 ml/g; preferably in the range from about 0.10 ml/g to about 0.20 ml/g; and most preferably in the range from about 0.12 ml/g to about 0.18 ml/g. The micropore volume of the pyrolyzed carbon catalyst of this invention is at least about 0.10 ml/g. More preferably, the micropore volume of the pyrolyzed carbon catalyst of this invention is in the range from about 0.20 ml/g to about 0.35 ml/g; most preferably in the range from about 0.22 ml/g to about 0.32 ml/g.

The measurement of porosity is derived from surface area and pore volume measurements obtained on any suitable instrument, such as a Micromeritics DIGI-SORB ® 2500 unit, using nitrogen as the adsorbate at the boiling point of nitrogen, 77K. The porosity of the carbon catalyst of the present invention is a function of the pyrolysis conditions, the activation of the catalyst and the porosity of the initial co-polymer used to make the catalyst. The methods used to obtain surface area and pore volumes are described by S. Lowell in Introduction to Powder Surface Area (John Wiley & Sons, 1979), or in the manuals provided with the DIGISORB® 2500 instrument made by the Micromeritics Instrument Corporation.

The carbon catalyst of this invention can possess any surface area provided the catalyst is active in the deep oxidation reaction. Generally, the carbon catalyst possesses a surface area of at least about 10 m$^2$/g. Preferably, the carbon catalyst possesses a surface area in the range from about 100 m$^2$/g to about 2000 m$^2$/g; more preferably, in the range from about 400 m$^2$/g to about 1500 m$^2$/g; most preferably in the range from about 600 m$^2$/g to about 900 m$^2$/g. The surface area is measured by the Brunauer-Emmett-Teller (BET) method. The BET method is described by R. B. Anderson, in Experimental Methods in Catalytic Research, Academic Press, 1968, pp. 48–66.

The catalyst of the present invention also can possess a variety of pore volumes, pore sizes, and surface areas provided the catalyst is effective in completely oxidizing the halogenated organic compound. The above-mentioned surface areas, pore sizes, and pore volumes are particularly preferred for the particular pyrolyzed hard carbon catalyst used in the oxidation of the particularly preferred halogenated organic compounds. As long as the pore volume, pore size, and surface area of the catalyst are effective in completely oxidizing the halogenated organic compound, the particular source of carbon is not limited provided only that the carbon catalyst can be formed having the effective parameters. The pore volume, pore size, and surface area of the catalyst of the present invention can be altered by modifying the catalyst formation conditions. For example, the temperature of pyrolysis as well as the pore volume of the initial co-polymer can be adjusted to bring the pyrolyzed catalyst to within the desired range. The skilled practitioner in the art will appreciate other known methods of modifying the parameters of the carbon catalyst in order to achieve the complete oxidation of the selected halogenated organic compound.

Although the inventors do not wish to bound by any theory, it is believed that the activity of the catalyst is related to not only the pore size, pore volume and surface area, but also to the redox activity and acidity of active sites within the pores of the catalyst. For example, washing the catalyst with dilute base substantially decreases the activity of the catalyst without changing the pore volume. The skilled practitioner will appreciate other known methods of modifying the redox activity and acidity of the catalyst. Accordingly, all parameters of the catalyst must be accounted for by the skilled practitioner in the art when selecting the appropriate catalyst useful for the complete oxidation of the selected halogenated organic compound.

The carbon catalyst of the present invention may be doped with an acidic, redox-active metal compound. A wide variety of acidic, redox-active metal compounds can be employed as dopants. Typically, the compounds are volatile, or soluble in solvents that disperse the compound over the carbonaceous material. Such compounds may be active in the form added, or may be active as the oxide, hydroxide or oxychloride formed upon hydrolysis. Particularly preferred dopants include $CrO_3$, $TiO_2$, $Ce(NO_3)_3$ and $KMnO_4$.

The carbonaceous catalysts of the present invention also have the ability to absorb halogenated organic compounds at ordinary temperatures normally near room temperature. Thus, these catalysts are known to be useful in removing halogenated organic compounds from the soil, water and other solutions, or air. The carbon catalyst can then be regenerated by contacting the catalyst with oxygen at the reaction temperature to oxidize the halogenated organic compounds absorbed on the catalyst. The halogenated organic compound is completely removed from the catalyst, and the reactor effluent is free from harmful halogenated organic compounds.

The process of the present invention is carried out at mild reaction conditions at temperatures sufficient to complete the oxidation reaction. Typically, the reaction temperature is less than about 400° C.; preferably less than about 300° C.; more preferably less than 275° C.; and most preferably about 250° C.

The particular flow rates of reactants, temperatures and pressures of the reaction, and retention time of reactants all vary depending upon the particular halogenated organic compound. Those which decompose or oxidize less readily require slower feed rates and longer retention times in the reactor. It is also difficult to accurately predict the operating capacities of a particular catalyst for a multi-component system without results from an actual column study. Static adsorption isotherm data can be used to approximate the weight or volume of an adsorbent required at a given contaminant concentration level. Flow rate constraints can then be used to estimate how long the column can remain in service. The particular type of reactor also varies with the halogenated organic compound oxidized. Generally, the reactor can be a standard fluid or fixed bed reactor designed to withstand the acidic products and reactants. The skilled practitioner in the art appreciates the manner in which these process condition and parameters can be modified.

The following examples further illustrate the practice of the subject invention.

EXAMPLES

Example 1

A catalyst was prepared for the deep oxidation of methylene chloride by placing 2.5 g of Anderson AX21 carbonaceous material (dried in vacuuo at 100° C. for 8 hours) in a round bottom flask with 50 ml of deionized water. The mixture was stirred and 0.5 g ($3.47 \times 10^{-3}$ moles) of $MoO_3$ were added to the flask. The slurry was refluxed for a minimum of 6 hours. The excess water was removed by rotary evaporation and subsequent drying in vacuuo at 100° C. for 8 hours to produce a doped Anderson AX21 catalyst.

The resulting catalyst was utilized in the oxidation of methylene chloride to HCl and $CO_2$. The catalyst (0.5 g) was placed in a glass reactor tube, and a six inch length of glass beads was placed over the catalyst to aid in mixing and preheating the reactants. The glass reactor tube was heated to 250° C. for a minimum of 2 hours. Methylene chloride (5.0 ml) was placed in a bubbler and kept at 0° C. An air stream of 1 ml/min was passed through the bubbler and the methylene chloride-saturated vapor was fed to the reactor and brought into contact with the catalyst. The post-catalyst stream was then passed through a water bubbler in order to trap the HCl formed in the reaction. The amount of methylene chloride destroyed was calculated by determining the amount of HCl in the post-catalyst stream. Hence, the conversion of methylene chloride to HCl and $CO_2$ was calculated.

Conversion of methylene chloride to HCl and $CO_2$ in a single pass over the catalyst was 20% based on the titration of the exit bubbler. However, formation of the volatile compound $MoO_2Cl_2$ during the reaction (deposited along the walls of the reaction tube beneath the catalyst) led to loss of activity after 20 hours.

Example 2

Example 1 was repeated using essentially the same catalyst preparation method illustrated in Example 1 except $WO_3$ was used in place of $MoO_3$. Tungsten was used to avoid formation of volatile oxychloride compounds which deposit along the walls of the reactor and lead to a loss in activity. Utilization of this catalyst according to the method described in Example 1 gave 16% conversion of the $CH_2Cl_2$ with no observed loss in activity over time.

Example 3

Example 1 was repeated using essentially the same catalyst preparation method illustrated in Example 1 except $(NH_4)_2WO_4$ was used in place of $MoO_3$. Use of this catalyst according to the method described in Example 1 gave 15% conversion of methylene chloride.

Example 4

A deep oxidation experiment was performed according to the method of Example 1 with two exceptions; Ambersorb ® 563 carbonaceous absorbent was used as the catalyst, and the exit bubbler contained NaOH solution rather than water (to better trap the HCl). Use of this catalyst and exit bubbler according to the method described in Example I gave 14% conversion.

Example 5

The method of Example 4 was repeated using Ambersorb ® 564 or Ambersorb ® 575 carbonaceous adsorbents in place of Ambersorb ® 563 as the catalyst. Using these catalysts according to the method of Example 4 gave 16% and 24% conversion respectively of methylene chloride.

Example 6

A metal doped catalyst was prepared by dissolving $7.0 \times 10^{-3}$ moles (0.70 g) of $CrO_3$ in 5.0 ml deionized water. This solution was added to 5.0 g of evacuated Ambersorb ® 563 carbonaceous adsorbents to form a slightly clumpy solid and no excess water was observed. This material was dried in vacuuo for 2 to 3 hours at 100° C. in order to obtain the final doped catalyst.

The resulting catalyst was utilized according to the method of Example 4, replacing Ambersorb ® 563 carbonaceous adsorbent as the catalyst, and 17% conversion was obtained in this example.

Example 7

The catalyst preparation method of Example 6 was repeated except Ambersorb ® 575 carbonaceous adsorbent was used as the carbonaceous support. Use of this catalyst according to the method of Example 4 gave 30% conversion.

Example 8

The Ambersorb ® 563 catalyst as prepared in Example 7 was utilized in the method of Example 4 with the exception of using a methylene chloride reservoir in place of a methylene chloride bubbler. The reservoir allows for only the vapor over the liquid to be carried to the catalyst rather than actually bubbling air through the liquid and saturating the carrier with the reactant. The amount of methylene chloride used in the reservoir was 1.0 ml.

Titration of the exit bubbler after reaction indicated 93% conversion of the methylene chloride to HCl. This result was corroborated by comparison of pre-catalyst and post-catalyst gas streams with GC (TCD) analysis which showed 95% of the methylene chloride converted to products.

Example 9

The method of Example 8 was repeated with the exception of using 2.0 g of catalyst instead of 0.5 g. The conversion according to this method was 99.9%, which was verified by GC analysis.

Example 10

The method of Example 8 was repeated with the exception of using 1,2-dichloroethane as the chlorinated reactant. The reservoir was kept at 25° C. in order to allow for a vapor pressure comparable to methylene chloride at 0° C. The conversion according to this method was 91% of the reactant in a single pass.

Example 11

The method of Example 9 was repeated with the exceptions of using untreated Ambersorb ® 563 carbonaceous adsorbents as the catalyst and 0.50 ml of methylene chloride in the reservoir. 69% conversion was observed.

Example 12

The following example shows that a porous carbonaceous support is needed to obtain high conversions of methylene chloride.

A solution was made up of $7.0 \times 10^{-3}$ moles (0.70 g) of chromium trioxide in 5.0 ml deionized water. This solution was added to 5.0 g dry silica gel (Davison grade 62). An additional 10 ml aliquot of water was added to fully saturate the support and completely disperse the chromium solution throughout the entire mixture. The mixture was then rotary evaporated and vacuum dried overnight to produce a doped silica gel catalyst which was a dark orange solid.

This catalyst was utilized according to the method of Example 8 and resulted in 49% conversion based on titration of the exit trap. However, volatilization of the metal was observed as soon as 1 hour after initiation, as was evidenced by a green colored deposit in the cool region of the reactor zone. The color of the catalyst after reaction was black.

Example 13

A titanium doped catalyst was prepared as follows: 6.0 ml of 1.0M titanium tetrachloride in dichloromethane was added to 4.06 g of Ambersorb ® 572 carbonaceous adsorbent in the presence of nitrogen. The solvent was removed by evacuation at room temperature for 14 hours. Hydrolysis to titanium dioxide was easily accomplished by exposure to atmospheric water vapor. Fuming of the material indicated the evolution of gaseous hydrochloric acid upon hydrolysis.

The resulting catalyst was utilized according to the method of Example 9 and a 93% conversion was observed by GC analysis.

Example 14

A mixed metal catalyst was prepared by the addition of a solution consisting of 0.04 g cerium nitrate and 0.04 g potassium permanganate dissolved in 10 ml water to 2.0 g of Ambersorb ® 572 carbonaceous adsorbent. The clumpy solid was then dried at 100° C. in vacuuo for three hours to obtain the final catalyst.

The resulting catalyst was used according to the method of Example 9 and a 95% conversion was observed by GC analysis.

Example 15

The method of example 9 was repeated with the exception of using a pyrolyzed, macroreticular polyacrylonitrile carbonaceous material as the catalyst. GC analysis showed 99.8% conversion which was repeatable to within 0.1%. This example illustrates the high activity obtained for certain undoped carbonaceous materials for deep oxidation.

The results of the foregoing Examples are summarized in Table 1.

Example 17

The following example demonstrates the utility of the catalyst for reactants with a molar ratio of Cl to H (Cl/H) greater than 1.

The method of Example 9 was repeated with the exceptions of utilizing 1,1,1,2-tetrachloroethane as the reactant, heating the reservoir to 100° C. and inserting a water bubbler in the stream preceding the halogenated organic reservoir. The intent is to utilize water as a hydrogen source for HCl formation where, as here, the reactant is hydrogen deficient relative to chlorine. Titration results show 63% conversion of available Cl to HCl which corresponds to 127% conversion of the available organic H to HCl. These results show that water added to the reactants stream contributed hydrogen for the deep oxidation reaction.

Example 18

This example demonstrates that halogenated aromatic compounds can be utilized in the deep oxidation system.

TABLE 1

| Example | Reactant | Addition Method | Catalyst (Amt. in g.) | Dopant | Conversion % | |
|---|---|---|---|---|---|---|
| 1 | MeCl$_2$ | Bubbling O$_2$ | AX21 (0.5) | MoO$_3$ | 20 | Comparison |
| 2 | MeCl$_2$ | Bubbling O$_2$ | AX21 (0.5) | WO$_3$ | 16 | Comparison |
| 3 | MeCl$_2$ | Bubbling O$_2$ | AX21 (0.5) | (NH$_4$)$_2$WO$_4$ | 15 | Comparison |
| 4 | MeCl$_2$ | Bubbling O$_2$ | 563 (0.5) | | 14 | Comparison |
| 5 | MeCl$_2$ | Bubbling O$_2$ | 564 (0.5) | | 16 | Comparison |
|   | MeCl$_2$ | Bubbling O$_2$ | 575 (0.5) | | 24 | Comparison |
| 6 | MeCl$_2$ | Bubbling O$_2$ | 563 (0.5) | CrO$_3$ | 17 | Comparison |
| 7 | MeCl$_2$ | Bubbling O$_2$ | 575 (0.5) | CrO$_3$ | 30 | Comparison |
| 8 | MeCl$_2$ | Reservoir | 563 (0.5) | CrO$_3$ | 93 | Invention |
| 9 | MeCl$_2$ | Reservoir | 563 (2.0) | CrO$_3$ | 99.9 | Invention |
| 10 | 1,2, dichloroethane | Reservoir | 563 (0.5) | CrO$_3$ | 91 | Invention |
| 11 | MeCl$_2$ | Reservoir | 563 (2.0) | | 69 | Invention |
| 12 | MeCl$_2$ | Reservoir | Silica gel (0.5) | CrO$_3$ | 49 | Comparison |
| 13 | MeCl$_2$ | Reservoir | 572 (2.0) | TiO$_2$ | 93 | Invention |
| 14 | MeCl$_2$ | Reservoir | 572 (2.0) | Ce(NO$_3$)$_3$ and KMNO$_4$ | 95 | Invention |
| 15 | MeCl$_2$ | Reservoir | pyrolyzed-polyacrylonitrile (2.0) | | 99.8 | Invention |

As can be seen by the above table, when the concentration of reactants is too high, and the amount of oxygen is deficient or the amount of catalyst is deficient, complete oxidation of the halogenated organic compound cannot be realized. For example, bubbling the oxygen through the halogenated organic compound can result in an oxygen stream saturated with the organic compound and stoichiometrically deficient in oxygen. Thus, these examples emphasize the necessity of maintaining the stoichiometric amounts of oxygen and water as well as halogenated organic compound in order to effect the complete oxidation.

The following examples illustrate other embodiments of the present invention.

Example 16

The method of Example 9 was repeated with the exception of using CH$_2$Br$_2$ in the reservoir as the halogenated reactant, and a conversion was 93% as observed by GC analysis.

2.0 g of the catalyst as prepared in Example 6 was placed in the fixed bed flow system described in Example 1. 0.1 ml of 1,2,4-trichlorobenzene was placed in a syringe and mechanically pumped at 0.06 cc/hr to the top of the catalyst zone. The reactant was vaporized and carried over the catalyst by the air stream. The air flow rate was adjusted to 6 ml/min in order to maintain the appropriate reaction stoichiometry. According to this method, 19% conversion of the reactant was obtained. The above feed rate is comparable to the feed rate of CH$_2$Cl$_2$ (0.05 cc/hr) utilized in Examples 1 through 7.

Example 19

The following example shows the need for maintaining acidic sites on the catalyst for optimal activity in deep oxidation.

A catalyst was prepared by treating 5.0 g of Ambersorb ® 563 with 5.0 ml of 28% NH$_3$ (aq). The resulting mixture was dried in vaccuo at 100° C. for 5 hours. 2.0 g of this catalyst was utilized according to the method of Example 11. According to this method, 52% conversion of the reactant was obtained. (A comparison of this result to that with untreated Ambersorb® 563 carbonaceous adsorbent (Example 11) indicates that the presence of a base does have an adverse effect on deep oxidation activity.)

Example 20

The method of Example 18 was repeated with the exception of using 5.0 ml of 1.764M KOH(alc) to treat the Ambersorb®563 carbonaceous adsorbent. The resulting catalyst was utilized in the method of Example 11. According to this method, the conversion was 32% of the reactant. This example demonstrates that very strong bases have a significantly more detrimental effect on deep oxidation activity than weaker bases.

Example 21

The following example demonstrates the utility of the deep oxidation reaction in the presence of a high concentration of water vapor.

A catalyst was prepared according to the method of example 13 with the exceptions of using 6.26 ml of $TiCl_4/CH_2Cl_2$ solution and 10.0 g of Ambersorb® 572 to give a catalyst with 5.1% $TiO_2$ by weight. 2.0 g of the catalyst was utilized in the method of example 10 (1,2-dichloroethane reactant) with the exception of adding a rapid water feed of 0.6 ml/hr (liquid). The initial segment of the experiment was performed with no water in order to determine the optimal conversion level using the catalyst. 99.7% conversion of the substrate was observed. Upon addition of the water feed, the conversion dropped and levelled off at 65.0%. This water feed corresponds to ca. 1000 bed volumes per hour of steam contacting the catalyst. The water feed was stopped and the system was allowed to equilibrate so that the reversibility of water inhibition could be determined. The conversion level returned to 99.7%, indicating no irreversible deactivation of the catalyst occurs upon contact with high concentration of water vapor.

Example 22

The method of example 21 was repeated with the exception of using a water feed of 0.12 ml/hr (liquid). This corresponds to ca. 200 bed volumes of steam per hour passing over the catalyst. The conversion observed was 93.8% dichloroethane reacted. This example illustrates the retention of high catalytic activity in the presence of a fairly high water concentration.

Example 23

The method of example 22 was repeated with the exception of using 235° C. as the reaction temperature. 91.5% conversion was observed in this example.

Example 24

The method of example 22 was repeated with the exception of using 225° C. as the reaction temperature. 65.6% conversion was obtained.

The foregoing examples illustrate the method of the present invention in completely converting certain halogenated hydrocarbons to the desired acid and carbon dioxide products. Other like halogenated hydrocarbons or mixtures can also be oxidized by the method of the present invention and those skilled in the art will recognize that various modifications may be made in the invention without departing from the spirit or scope thereof, and it is understood that the invention is limited only as defined in the appended claims.

Example 25

The method of example 24 was repeated with the exception of using no water feed. Conversion was 84.9%. This example, along with Example 24, illustrate that at temperatures less than 250° C. the catalyst is still active both in the absence and the presence of water vapor.

Example 26

This example demonstrates that hydrogen can be provided solely from a non-organic source when utilizing a totally halogenated organic reactant.

The method of example 17 was repeated with the exceptions of using tetrachloroethylene as the organic reactant and a reservoir temperature of 60° C. Conversion of the reactant was 16%. This low conversion is a result of using water as a limiting reagent to contribute the hydrogen due to the fact that the reactant of this example contributed no hydrogen at all.

Example 27

The initial segment of example 21 (1,2-dichloroethane reactant, no water feed, $TiO_2$/Ambersorb® 572 catalyst) was repeated using undoped Ambersorb® 572 in place of the titanium doped analog. conversion was 97.4%. A water feed of 0.12 ml/hr (liquid) was added to the reactant stream to determine the effect of water vapor on undoped carbonaceous materials. The conversion with water present was 96.8%. This observation, when compared to Example 22, indicates a much lower influence of water vapor on undoped vs. doped carbonaceous supports.

We claim:

1. A method of completely oxidizing a halogenated organic compound which comprises:
   contacting, at a temperature below about 400° C., a carbonaceous catalyst having acidic sites with the halogenated organic compound and an amount of oxygen at least sufficient to achieve complete oxidation of the halogenated hydrocarbon, wherein said temperature is sufficient to achieve complete oxidation of the halogenated hydrocarbon and wherein said catalyst comprises a partially pyrolyzed resin containing macropores, mesopores and micropores.

2. The method of claim 1, wherein the halogenated organic compound is selected from the group consisting of aliphatic halides and aromatic halides.

3. The method of claim 2 wherein said aliphatic halide has the structural formula (I):

$$C_nH_mX_{ps} \qquad (I)$$

wherein n is a whole number ranging from 1 to 10 inclusive, p is a whole number ranging from 1 to (2n+2) inclusive, m is represented by 2n−p+2, and is a whole number ranging from 0 to (2n−p+2) inclusive, and X represents any halide.

4. The method of claim 2 wherein said aliphatic halide is selected from the group consisting of $CH_2Cl_2$, $C_2H_2Cl_4$, $C_2H_4Cl_2$, $CH_2BR_2$, and trichlorobenzene.

5. The method of claim 3 wherein X is Cl, Br or I.

6. The method of claim 5 wherein X is Cl.

7. The method of claim 1 wherein said catalyst has a macropore size of at least 500 Angstroms in average diameter, a mesopore size in the range from about 20 Angstroms to about 500 Angstroms in average diameter, and a micropore size of less than 20 Angstroms in average diameter, and wherein the macropores have a volume of at least about 0.10 ml/g, the mesopores have a volume in the range from about 0.05 ml/g to about 0.30 ml/g, and the micropores have a volume in the range from about 0.10 ml/g to about 0.40 ml/g.

8. The method of claim 7 wherein the catalyst has a specific area in the range from about 100 m²/g to above 2000 m²/g.

9. The method of claim 7 wherein the catalyst has a specific area in the range from about 600 m²/g to about 900 m²/g.

10. The method of claim 1 wherein the reaction temperature is below about 300° C.

11. The method of claim 1 wherein the reaction temperature is below about 275° C.

12. The method of claim 1 wherein said temperature is from about 250° C. to about 400° C.

13. A method of regenerating a carbonaceous catalyst saturated with halogenated organic compounds, said catalyst having acidic sites and comprising a partially pyrolyzed resin containing macropores, mesopores and micropores, which method comprises:

heating the carbonaceous catalyst saturated with halogenated organic compounds, at a temperature of below about 400° C., in the presence of an amount of oxygen, air, or mixture of steam with oxygen or air, at least sufficient to achieve complete oxidation of the halogenated organic compound.

14. The method of 13 wherein the halogenated organic compound is selected from the group consisting of aliphatic halides and aromatic halides.

15. The method of claim 14 wherein said aliphatic halide has the structural formula (I):

$$C_nH_mX_p \qquad (I)$$

wherein n is a whole number ranging from 1 to 10 inclusive, p is a whole number ranging from 1 to (2n+2) inclusive, m is represented by 2n-p+2, and is a whole number ranging from 0 to (2n-p+2) inclusive, and X represents any halide.

16. The method of claim 15 wherein said aliphatic halide is selected from the group consisting of CH₂Cl₂, C₂H₂Cl₄, C₂H₄Cl₂, CH₂Br₂, and trichlorobenzene.

17. The method of claim 15 wherein X is Cl, Br or I.

18. The method of claim 17 wherein X is Cl.

19. The method of claim 13 wherein said catalyst has a macropore size of at least 500 Angstroms in average diameter, a mesopore size in the range from about 20 Angstroms to about 500 Angstroms in average diameter, and a micropore size of less than 20 Angstroms in average diameter, and wherein the macropores have a volume of at least about 0.10 ml/g, the mesopores have a volume in the range from about 0.05 ml/g to about 0.30 ml/g, and the micropores have a volume in the range from about 0.10 ml/g to about 0.40 ml/g.

20. The method of claim 19 wherein the catalyst has a specific area in the range from about 100 m²/g to above 2000 m²/g.

21. The method of claim 20 wherein the catalyst has a specific area in the range from about 600 m²/g to about 900 m²/g.

22. The method of claim 13 wherein the reaction temperature is below about 300° C.

23. The method of claim 13 wherein the reaction temperature is below about 275° C.

24. A method of removing halogenated organic compounds from soil, water and other solutions or air which comprises:

contacting the soil, water or air containing the halogenated organic compound with a carbonaceous catalyst at room temperature, said catalyst having acidic sites and comprising a partially pyrolyzed resin containing macropores, mesopores and micropores, and heating the carbonaceous catalyst, at a temperature of below about 400° C., in the presence of an amount of oxygen, air, or mixture of steam with oxygen or air, at least sufficient to achieve complete oxidation of the halogenated organic compound, wherein said temperature is sufficient to achieve complete oxidation of the halogenated hydrocarbon.

25. The method of claim 24 wherein the halogenated organic compound is selected from the group consisting of aliphatic halides and aromatic halides.

26. The method of claim 25 wherein said aliphatic halide has the structural formula (I):

$$C_nH_mX_p \qquad (I)$$

wherein n is a whole number ranging from 1 to 10 inclusive, p is a whole number ranging from 1 to (2n+2) inclusive, m is represented by 2n-p+2, and is a whole number ranging from 0 to (2n-p+2) inclusive, and X represents any halide.

27. The method of claim 25 wherein said aliphatic halide is selected from the group consisting of CH₂Cl₂, C₂H₂Cl₄, C₂H₄Cl₂, CH₂Br₂, and trichlorobenzene.

28. The method of claim 26 wherein X is Cl, Br or I.

29. The method of claim 28 wherein X is Cl.

30. The method of claim 24 wherein said catalyst has a macropore size of at least 500 Angstroms in average diameter, a mesopore size in the range from about 20 Angstroms to about 500 Angstroms in average diameter, and a micropore size of less than 20 Angstroms in average diameter, and wherein the macropores have a volume of at least about 0.10 ml/g, the mesopores have a volume in the range from about 0.05 ml/g to about 0.30 ml/g, and the micropores have a volume in the range from about 0.10 ml/g to about 0.40 ml/g.

31. The method of claim 30 wherein the catalyst has a specific area in the range from about 100 m²/g to above 2000 m²/g.

32. The method of claim 30 wherein the catalyst has a specific area in the range from about 600 m²/g to about 900 m²/g.

33. The method of claim 24 wherein the reaction temperature is below about 300° C.

34. The method of claim 24 wherein the reaction temperature is below about 275° C.

35. The method of claim 24 wherein said temperature is from about 250° C. to about 400° C.

* * * * *